Figure 1:
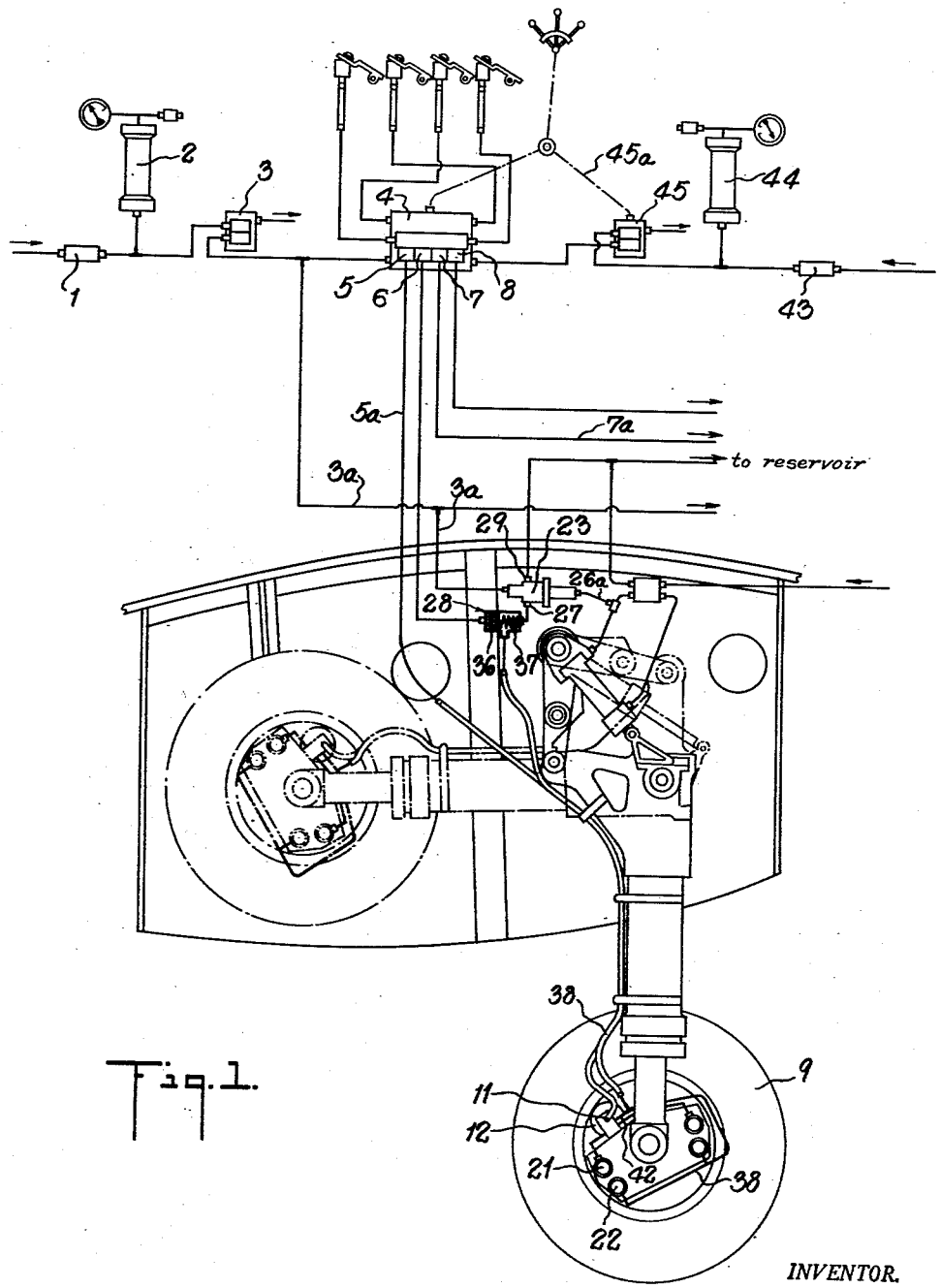

Aug. 21, 1956 D. DEWAR 2,759,690
BRAKING SYSTEMS FOR AIRCRAFT
Filed Dec. 14, 1954 4 Sheets-Sheet 2

INVENTOR.
Douglas Dewar
by Benj. T. Pauler
his attorney

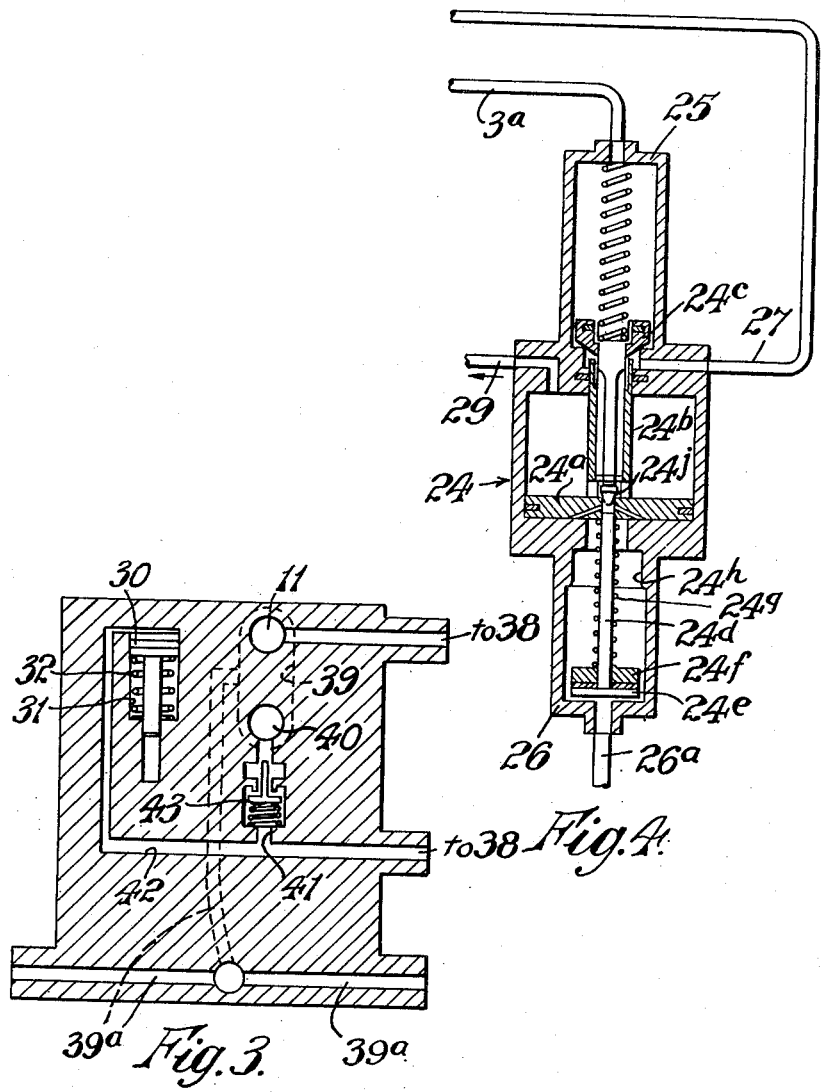

Aug. 21, 1956 D. DEWAR 2,759,690
BRAKING SYSTEMS FOR AIRCRAFT
Filed Dec. 14, 1954 4 Sheets-Sheet 4

INVENTOR
Douglas Dewar
by Benj. T. Pauber
his attorney

United States Patent Office 2,759,690
Patented Aug. 21, 1956

2,759,690

BRAKING SYSTEMS FOR AIRCRAFT

Douglas Dewar, Wolston, near Coventry, England, assignor to Dunlop Rubber Company Limited, London County, England, a British company Application December 14, 1954, Serial No. 475,141

Claims priority, application Great Britain December 19, 1953

7 Claims. (Cl. 244—111)

This invention relates to braking systems for aircraft, and more particularly relates to a braking system comprising duplicate systems, i. e. a main and an emergency brake system.

Aircraft braking systems are known comprising a main source of supply and associated system and braking mechanism and a separate emergency source of supply and associated system and braking mechanism. Thus should the main source fail, or one of the main system pipe-lines be damaged, the pilot can turn on to his emergency system and apply the brake through the emergency source of fluid pressure.

My invention provides an improved braking system of this nature.

My invention may be applied for example to a wheel braking system for aircraft having main and emergency sources of fluid pressure, a main and emergency brake-operating mechanism associated with each main wheel, automatic braking apparatus having inlet and exhaust connections and associated with each main brake-operating mechanism for controlling the braking pressure from the main source and a brake operating valve mechanism for applying braking pressure from either the main or emergency source. In connection with such a system my invention further comprises a fluid pressure line connecting said brake operating valve mechanism with the inlet connection of each of said automatic braking apparatus, a second fluid pressure line connecting said brake operating valve mechanism with each of the emergency brake operating mechanisms and with the exhaust connection of its associated automatic braking apparatus and a shuttle valve interposed in each of said second fluid pressure lines spring-loaded to normally connect said exhaust connection to a liquid reservoir or to atmosphere but movable in the other direction by fluid pressure from the emergency source to connect said source to said emergency brake operating mechanisms.

Preferably the aircraft undercarriage is retractable and means are provided to apply braking pressure to the wheel brakes for a limited period after the undercarriage has been retracted and also to operate a mechanism which prevents the application of the wheel brakes before the wheels have rotated on landing.

Preferably also the brake operating mechanism is adapted to be manually operated whereby the brakes may be applied when the aircraft is static.

Preferably also pressure reducing valves are incorporated in the system, one of which may be made operative by the manual operation of a lever or like means.

Figure 2:
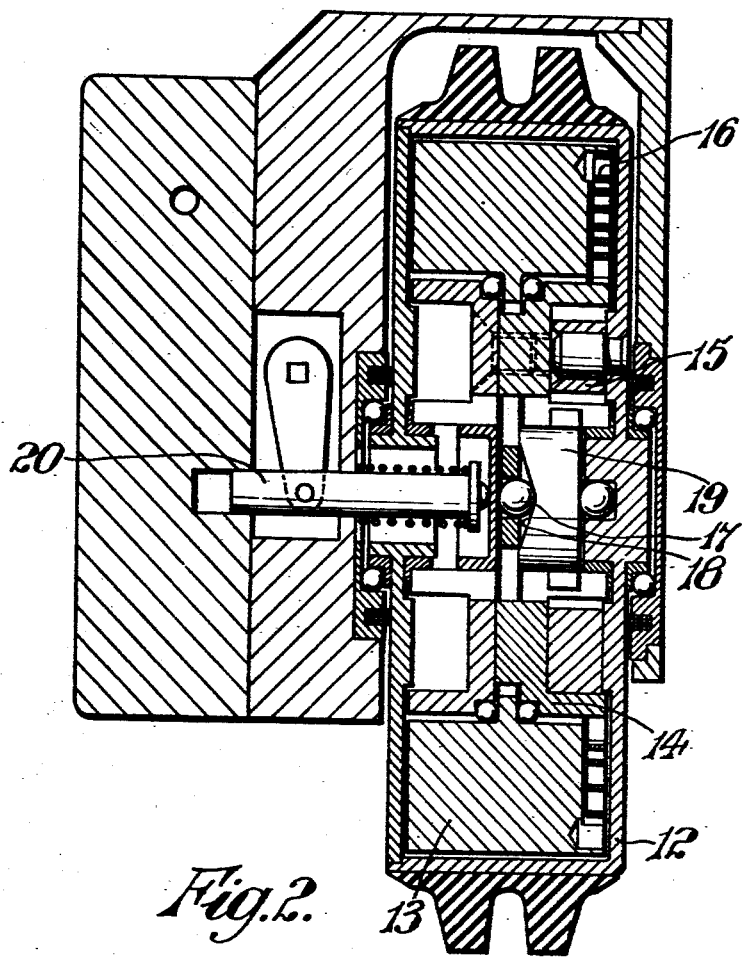
Figure 5:
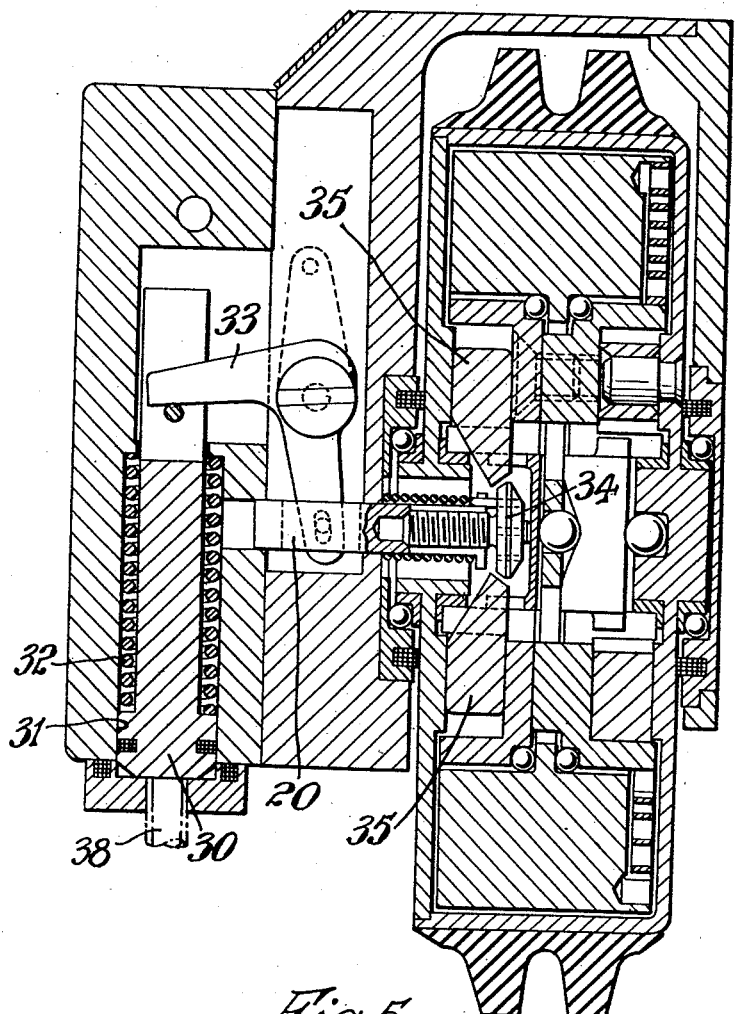

The invention will now be described with reference to the accompanying drawings of which:

Figure 1 is a diagrammatic representation of a braking system constructed according to the invention, Figure 2 is a cross-section of the rotary inertia automatic braking device shown diagrammatically in Figure 1, Figure 3 is a diagrammatic section of the valve assembly forming a part of and controlled by the rotary inertia device of Figures 1 and 2, Figure 4 is a cross-section of a cocking valve shown diagrammatically in Figure 1, Figure 5 is a cross-section of the rotary inertia device of Figure 2 with which is incorporated a mechanism for preventing the application of the wheel brakes until the wheels have rotated on landing.

In one embodiment of the invention (Figure 1) a braking system for aircraft comprises a main source of fluid pressure and an emergency source of fluid pressure. The main supply passes from its source through a non-return valve 1, an accumulator 2 and a reducing valve 3 which reduces the pressure from the source, which may be of the order of 3,000 p. s. i. to a lower value, of the order of 1,500 p. s. i. From the reducing valve 3 it passes to an input nozzle of a brake operating valve mechanism 4 of the type more fully described in Patent No. 2,682,282, June 29, 1954, to which reference is made for a detailed description of the valve mechanism. This mechanism briefly comprises four identical valve mechanisms, represented as 5, 6, 7 and 8 having a common exhaust chamber, but each being provided with an independent output connection, alternate mechanisms being connected to the same source of pressure fluid. Reading from the left to the right hand side, mechanisms numbers 5 and 7 are connected to the main source of supply and mechanisms 6 and 8 are connected to an emergency source of supply. Mechanisms 5 and 6 are mechanically coupled together and are hydraulically actuated by means of a master cylinder associated with the pilot's port brake pedal to operate the brake of the port landing wheel 9, whilst mechanisms 7 and 8 are coupled together and are also hydraulically actuated by means of a master cylinder associated with the pilot's starboard brake pedal to operate the brake of the starboard landing wheel 10 in a manner shown, for example, in Fig. 8 of the above patent. Furthermore the mechanisms 5, 6, 7 and 8 are linked together and indirectly connected by a cable or the like, to an operating lever whereby they may be made operative when the aircraft is static.

The output connection of mechanism number 5 is connected by means of a conduit 5ᵃ, at the port landing wheel 9, to the inlet valve 11 (Figs. 1 and 3) of a valve mechanism operably associated with a rotary inertia apparatus for automatically controlling the braking pressure to prevent slide or slip of the said landing wheel. This mechanism (Figure 2) comprises a housing 12 rotatable by the said landing wheel in which is enclosed a flywheel 13 and a drum member 14. The drum member 14 is rotated by said housing 12 through a clutch mechanism 15 and the flywheel may move angularly relative to said drum member against the restraining force of a clock-type spring 16. Such relative movement causes balls 17 to ride up the sides of a V notch 18 in a cam member 19 thereby imparting axial movement to an operating rod 20 to close the associated inlet valve 11 and open an associated exhaust valve 40. This mechanism and apparatus is more fully described in Patents No. 2,656,017, October 20, 1953; No. 2,692,100, October 19, 1954, and No. 2,696,958, December 14, 1954. The output connection of mechanism number 7 is connected by a conduit 7ᵃ to similar mechanism or apparatus associated with the starboard wheel. The operation of said rotary inertia apparatus permits inlet valve 11 to open and outlet valve 40 to close to permit pressure fluid to flow through said inlet valve 11 in the manner more fully described in said Patents 2,656,017; 2,692,100 and 2,696,958, and thence to a space between two pistons 21, 22 of a double piston and cylinder assembly (illustrated diagrammatically in Figure 1), for operating the wheel brakes. A double piston and cylinder assembly of this type is more fully described in co-pending application of Butler, Ser. No. 376,058 filed August 24, 1953.

From the reducing valve 3 pressure also passes through a conduit 3ª to one end of each of a pair of cocking valves, 23, 23 one associated with the starboard wheel brakes and one with the port wheel brakes.

Each cocking valve (Figure 4) comprises a cylindrical housing 24 having tubular portions 25, 26 extending coaxially from each end thereof, portion 26 being connected through a conduit 26ª to the retraction side of an undercarriage jack (not shown) and portion 25 being connected to conduit 3ª. The cylindrical housing also has a connection 27 leading to a shuttle valve 28 to be later described, and a further connection 29 leading to a fluid reservoir (not shown). As more fully described in co-pending application of Trevaskis and Mortimer, Ser. No. 430,647, filed May 18, 1954, pressure fluid supplied to retract the landing gear also passes through a conduit 26ª to the underside of a piston 24ª in the cocking valve to lift this piston. As the piston rises it lifts a hollow valve stem 24ᵇ against a valve 24ᶜ thus opening a passage from a branch supply line 3ª to the connection 27 leading to the shuttle valve 28 and thence to a piston and cylinder 30, 31, Figs. 3 and 5, of the brake applying means to actuate the brake applying mechanism to shift the rod 20 and apply the brakes. As the piston 24ª rises it carries with it a depending stem 24ᵈ and a supporting plate 24ᵉ at its lower end on which rests a tapered plug 24ᶠ pressed onto the plate by a spring 24ᵍ. As the piston reaches its uppermost position the plug 24ᶠ fits fluid-tightly into a recess 24ʰ and is retained there by the pressure in the part 26. The small amount of fluid trapped above the plug 24ᶠ slowly leaks through a leak valve 24ʲ to the space above the piston and thence through the conduit 29 to the reservoir. As the pressure equalizes on opposite sides of the piston 24ª it descends under the pressure of the supply fluid on the valve 24ᶜ until it seats on its valve seat and then further lowering of the hollow stem 24ᵇ opens the line 27 to exhaust. Thereupon the brakes are released. This action is timed to allow time to stop the brakes from spinning. Upon lowering the landing gear the fluid is released from the part 26 and the plug 24ᶠ drops to the position shown in Fig. 4. The apparatus is then in position to land and to apply the brakes under the control of the automatic mechanism.

The piston and cylinder mechanism which prevents the application of the wheel brakes before they have rotated on landing comprises a piston 30 (Figure 5) slidable in a cylinder 31 and adapted to be moved against a spring 32 by the application of pressure fluid thereto. A bell crank lever 33 associated with said piston 30 is connected to the operating rod 20 of a rotary inertia apparatus of the type previously described, said operating rod being provided with a head 34, which is adapted to engage inwardly spring urged catches 35, which in turn are adapted to move outwardly by centrifugal force when the housing of the rotary inertia device is rotated.

In operation, when pressure is applied to move said piston 30 the bell crank lever 33 is moved angularly by said piston, and the operating rod 20 is moved axially to close the inlet valve and open the exhaust valve of the associated rotary inertia apparatus. The head 34 of the operating rod 20 is thus drawn between the spring urged catches 35 which subsequently move inwardly again to prevent the operating rod from returning, even though the piston 30 returns to the end of the cylinder 31 by the action of spring 32. This condition of inlet and exhaust valves and operating rod is maintained, until the wheel rotates on landing, causing the catches 35 to move outwardly to release the operating rod. This construction is more fully described in Patent No. 2,692,100, October 19, 1954.

The shuttle valves 28 are interposed between the cocking valves 23 and their associated piston and cylinder mechanisms, and each comprises two valve-seats, one at each end thereof and a slidable plunger 36 having a valve member at each side thereof to contact said seats. The plunger 36 is spring urged against one valve seat to allow fluid pressure from the associated cocking valve 23 to flow through the shuttle valve 28, out of a port 37 intermediate the said valve seats and thence to the cylinder 31 of the piston and cylinder mechanism.

A pressure fluid connection 38 is also provided from the line extending from the shuttle valve 28 to the piston and cylinder mechanism and adjacent said mechanism and said connection 38 leads to a space behind the two pistons 21, 22 of the brake operating double piston and cylinder assembly more fully described in said application Ser. No. 376,058.

The valve mechanism associated with each rotary inertia apparatus is shown diagrammatically in Fig. 3 and more in detail in co-pending application of Dewar and Mortimer, Serial No. 317,522 filed October 29, 1952, and comprises a pressure chamber 39 communicating through passages 39ª with the brake; the inlet valve 11 being supplied through the operating mechanism from the main source of supply; and an exhaust valve 40. Both the exhaust and inlet valves are operated automatically by said rotary inertia apparatus. A conduit 41 connects the exhaust valve 40 with a passage 42 extending between the piston and cylinder mechanism and the shuttle valve 28. A spring-loaded normally-closed valve 43 is interposed in said conduit 41 and opens when the exhaust valve 40 opens to permit exhaust pressure to flow to the shuttle valve 28 and thence to the cocking valve 23 from where it flows to the reservoir.

The operation of the brakes and the system generally from the main source of supply is as follows. As the aircraft takes off the undercarriage is retracted, and pressurization of this side of the jack opens the cocking valves 23, 23 to allow pressure from the source to flow through each associated shuttle valve 28 to the piston and cylinder mechanisms. This closes the inlet valve 11 to prevent the brakes from being applied through the pilot's control, although provision is made to the cocking valve 23, as described above to allow the brakes to be applied automatically for a short period to prevent the wheels from spinning when retracted.

As the aircraft comes in to land the undercarriage is lowered and as soon as the landing wheels rotate on the ground the centrifugally operated mechanism opens the inlet valve 11 associated with the rotary inertia apparatus and allows the pilot to operate the brakes, substantially as described in said Patent No. 2,692,100. The rotary inertia apparatus then takes over to control the braking pressure in the manner described in Patent Nos. 2,656,-017; 2,692,100 and 2,696,958.

The passage 42 and the connection 38 leading to the space behind the double brake-operating pistons 21, 22 and the shuttle valve 28 is of course not pressurized during this phase of the braking operation, and so the brakes are only operated by the pressure between the pistons 21, 22 and this is controlled by the rotary inertia apparatus.

It is possible that during service a part of the system hereinabove described may be damaged, i. e. either the main source of pressure or one of the main pressure lines, and as soon as the pilot realises that his brakes have failed he operates a lever or the like to permit pressure fluid from an emergency source to flow to the valve mechanism 4.

For this purpose the reducing valve 45 is adapted to be made operative by means of a cable 45ª secured to said lever or the like, such a construction of reducing valve and its mode of operation being more fully described in, and illustrated in Figure 6 of Patent No. 2,-682,282. The emergency or secondary source of fluid pressure leads through a non-return valve 43, accumulator 44 and reducing valve 45 to the input side of mechanisms 6 and 8 of the brake operating valve mechanism 4 previously described. The output sides of said mechanisms 6, 8 are connected to the other end of each shuttle valve 28, i. e. to the end normally closed by the spring-loaded plunger 36.

The operation of the emergency system is as follows. As soon as the pilot realizes that his main pressure is gone and that his brakes are not operating, he switches over on his emergency source. Operation of the brake pedals will now effectively operate mechanisms 6 and 8 of the brake operating valve mechanism 4, mechanisms 5 and 7 being ineffective. From the output side of said mechanisms 6, 8 pressure fluid flows, on the brake pedals being depressed, to each of the shuttle valves, 28 where it forces the plunger 36 of each back against its spring to close the other end of the valve. Emergency pressure then flows down the lines 42 connecting each shuttle valve 28 with the piston and cylinder mechanism and also through the connection 38 leading to the spaces behind the double pistons of the brake-operating mechanisms.

Emergency pressure fluid also flows into the conduit 41 leading to the exhaust valve 40 of the valve mechanism but it cannot pass the spring-loaded and closed valve 43 interposed in said conduit 41. It also flows to the piston and cylinder mechanism and may operate it; this, however, does not matter, since the rotary inertia apparatus is now inoperative. The pressure fluid behind the double pistons 21, 22 of the brake-operating mechanism applies the brakes in the normal way, i. e. the braking pressure is controlled by the pilot through his foot pedals and not automatically through the rotary inertia apparatus employed in the main system.

One particular advantage of a system constructed in accordance with this invention is that there are only two fluid pressure lines extending down each oleo-leg.

Having now described my invention, what I claim is:

1. A braking system for aircraft having fluid pressure operated wheel brakes, main and alternative sources of fluid pressure, and a retractable undercarriage comprising an inertia operated device for controlling the flow of fluid from the main source to said brakes, a centrifugally responsive means to prevent the application of fluid pressure from said main source to the associated wheel brake before the aircraft wheels rotate on landing, valve means operatively connected to a further source of fluid pressure to permit the flow of fluid from said main source to apply the wheel brakes on retraction of said undercarriage and valve means including a delay device to release braking pressure from the wheel brakes after a predetermined period of time after the retraction of said undercarriage, and brake control means selectively operable to connect said wheel brakes directly with the said alternative source of fluid pressure and thereby discontinue the operation of that part of the system operated by flow of pressure fluid from the said main source.

2. A braking system according to claim 1 comprising a conduit connecting said brake control means and said wheel brake and a further conduit connecting the said conduit to an exhaust connection of said inertia operated device.

3. A braking system according to claim 2 comprising a normally closed one-way valve interposed in said exhaust connection to prevent flow of pressure fluid from said conduit into said inertia operated device.

4. A braking system for aircraft which comprises fluid operated wheel brakes, a supply conduit for each of said brakes, pilot operated valves to admit fluid to said conduits, an inertia operated mechanism having an inlet valve to admit fluid from each said conduit to the brakes of one wheel and an exhaust valve to exhaust fluid from said brakes to said conduit, a latch to hold said inlet valve closed and said exhaust valve open and a centrifugally responsive device driven by said wheel to release said latch and a shuttle valve in said conduit having an exhaust outlet and spring pressed to close the passage through said conduit to said brakes and to open passage from said brakes to said exhaust outlet and movable by fluid pressure supplied to said conduit to open passage to said brakes and close said outlet therefrom.

5. The braking system of claim 4 having a fluid pressure system to retract the undercarriage of said aircraft, a cocking valve having an exhaust, an inlet for pressure fluid and a connection to the exhaust outlet of said shuttle valve and having valve parts spring pressed to close said inlet from said exhaust and said connection to said shuttle valve and open communication from said shuttle valve, and means operated by the fluid supply to said system for retracting the undercarriage to move for a limited time said valve parts to open said inlet to said connection to said shuttle valve and close said exhaust from said inlet and said connection.

6. The braking system of claim 5 in which said means operated by the fluid supply to said retracting system comprises a piston and means to entrap a limited supply of said fluid to said system and a leak valve element from said entrapped fluid to said exhaust.

7. A braking system for aircraft which comprises fluid operated wheel brakes, a main source of pressure fluid supply, an emergency source of pressure fluid supply, and a retractable undercarriage having landing wheels and retraction operating mechanism, an inertia operated device on said undercarriage for controlling the flow of fluid from the main source of supply to said brakes comprising a control means to prevent the application of fluid pressure from said main source of supply to the wheel brakes before the aircraft wheels rotate on landing, and a centrifugally operated device rotatable by the landing wheels of said undercarriage to release said means to permit the application of fluid pressure to said main source of pressure fluid supply to said brakes which comprises in succession valve means actuated for a limited time by the retraction operating mechanism of said undercarriage to permit the passage of fluid and when not actuated to permit the exhaust of fluid from said brakes through said control means, and a shuttle valve between said valve means spring pressed to open position to permit passage of fluid from said valve means to said brakes and exhaust from said brakes, a connection from said emergency source of pressure fluid supply to said shuttle valve to close said shuttle valve to said valve means and open a passage from said emergency source to said brakes, and manually controlled valves to control alternatively the supply of fluid from said main source to said control means and the supply of fluid from said emergency source to said shuttle valve.

References Cited in the file of this patent

UNITED STATES PATENTS

| | | |
|---|---|---|
| 2,484,888 | Hollerith | Oct. 18, 1949 |
| 2,502,152 | Hudson | Mar. 28, 1950 |
| 2,504,096 | Wells | Apr. 11, 1950 |
| 2,692,662 | Clifton | Oct. 26, 1954 |